United States Patent
Braun et al.

[11] Patent Number: 5,845,545
[45] Date of Patent: Dec. 8, 1998

[54] TAMPER RESISTANT COVER FOR TRANSMISSION SHIFT

[75] Inventors: Eugene R. Braun; William R. Pankratz, both of Royal Oak, Mich.

[73] Assignee: Eaton Corporation, Cleveland, Ohio

[21] Appl. No.: 969,290

[22] Filed: Nov. 13, 1997

Related U.S. Application Data

[63] Continuation of Ser. No. 341,335, Nov. 16, 1994, abandoned, which is a continuation of Ser. No. 18,646, Feb. 17, 1993, abandoned.

[51] Int. Cl.$^6$ ................................................. F16H 57/02
[52] U.S. Cl. .................................... 74/606 R; 74/335
[58] Field of Search ........................ 74/606 R, 335

[56] References Cited

U.S. PATENT DOCUMENTS

| | | | |
|---|---|---|---|
| 5,178,027 | 1/1993 | Kobayashi et al. | 74/606 R |
| 5,182,966 | 2/1993 | von Kaler et al. | 74/606 R |
| 5,195,401 | 3/1993 | Mouton | 74/606 R |
| 5,211,077 | 5/1993 | Louis et al. | 74/606 R |
| 5,220,854 | 6/1993 | Allart et al. | 74/606 R |
| 5,269,201 | 12/1993 | Uematsu | 74/606 R |

FOREIGN PATENT DOCUMENTS

| | | | |
|---|---|---|---|
| 0526825 | 2/1993 | European Pat. Off. | 74/606 R |
| 3-249460 | 11/1991 | Japan | 74/606 R |

*Primary Examiner*—Vinh T. Luong
*Attorney, Agent, or Firm*—Roger A. Johnston; Howard D. Gordon

[57] ABSTRACT

A tamper-resistant technique for retaining the cover of an electronically controlled air pressure piston operated automatic overdrive shifter employed on the auxiliary section of a change-speed transmission for heavy on-highway truck. In one embodiment a spring loaded slider tracks movement of the piston to cam a locking pin into engagement with a blind bolt to prevent removal of the cover when the piston is not in the overdrive position thereby requiring test equipment to operate the controller for cover removal. In another embodiment, the cover mounting has portions frangibly removable upon installation with press-in discs covering the bolts thereafter to deter removal. In another embodiment, a blind recessed roll pin is driven through slots in the bolt head to deter removal.

5 Claims, 7 Drawing Sheets

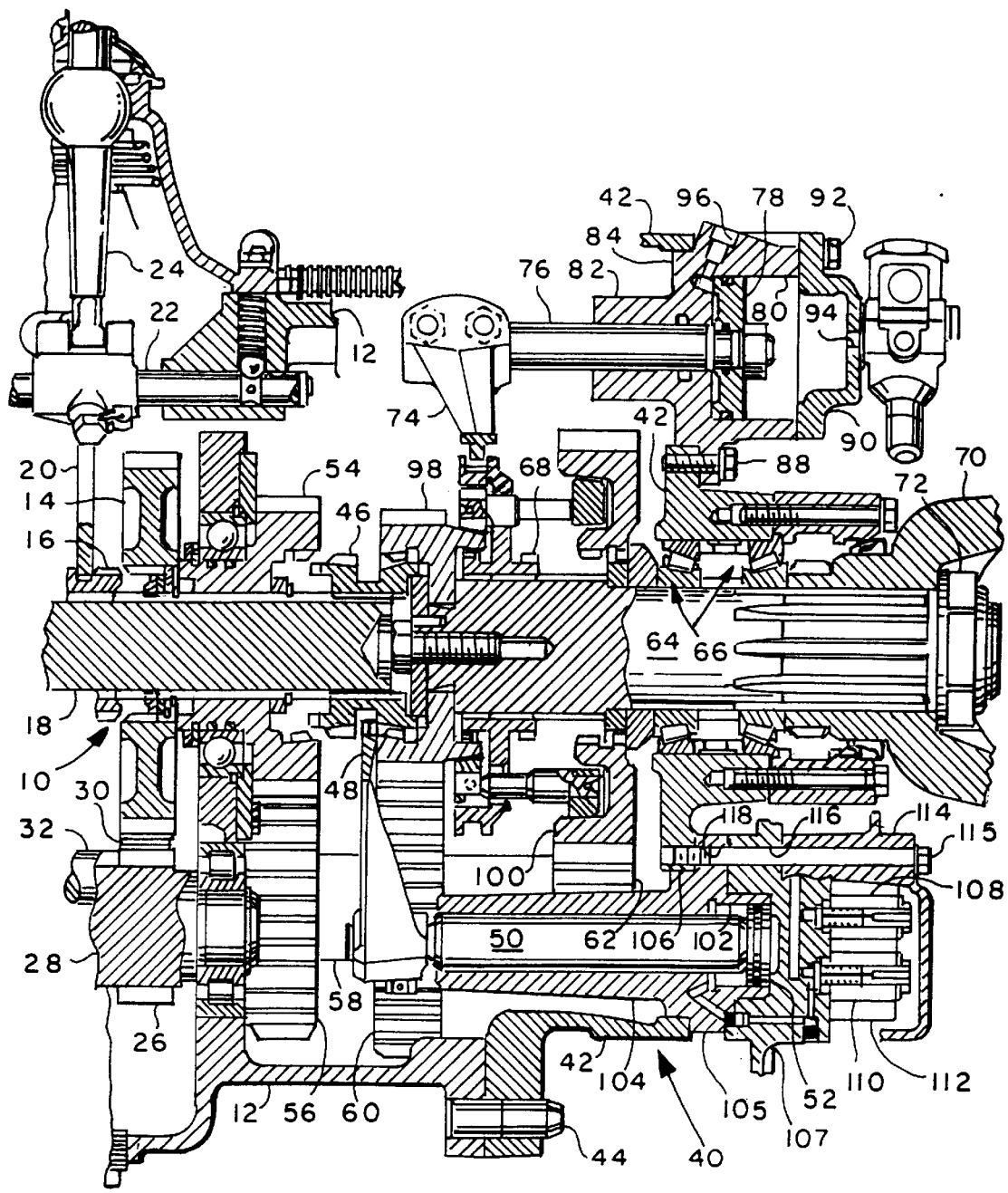
PRIOR ART

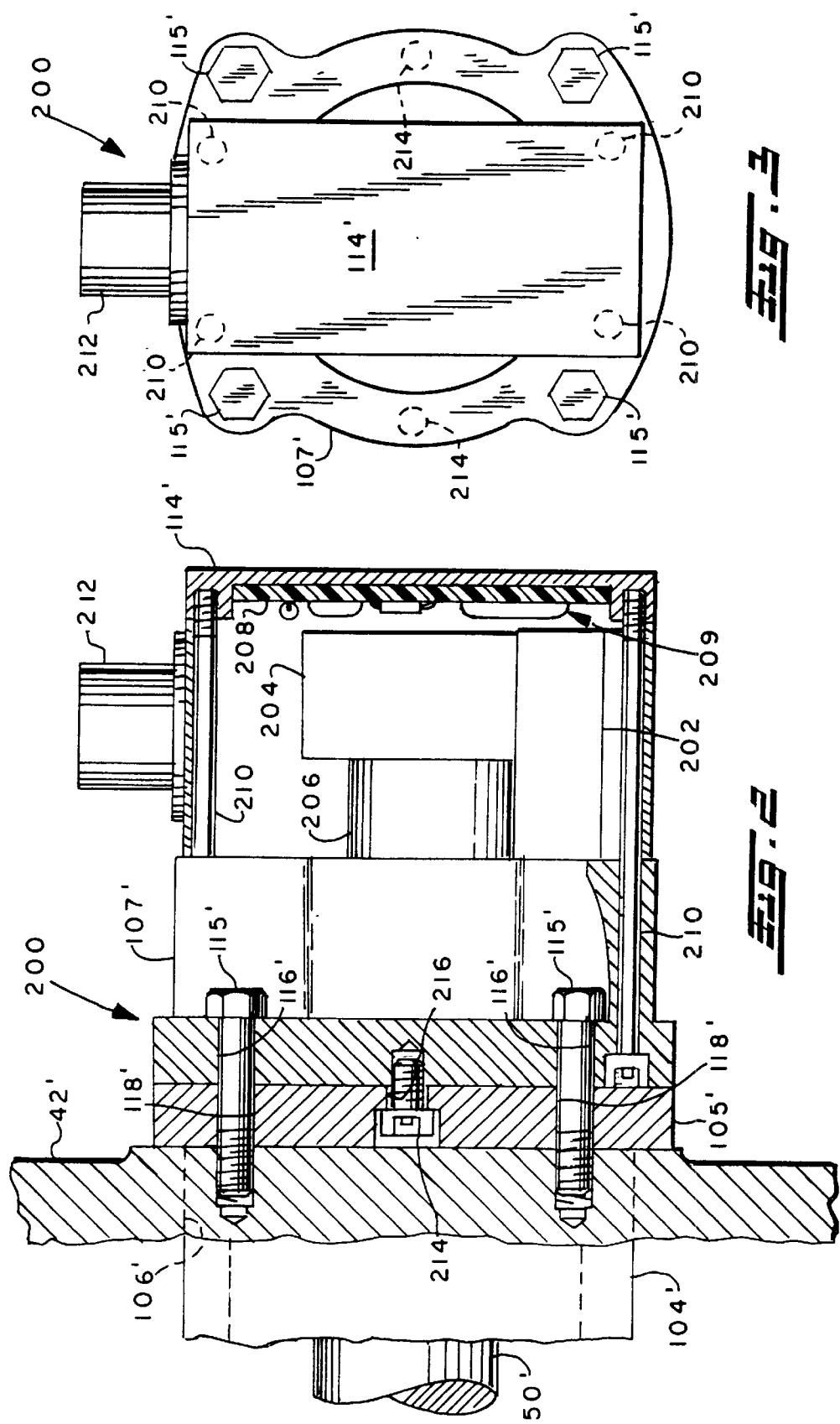

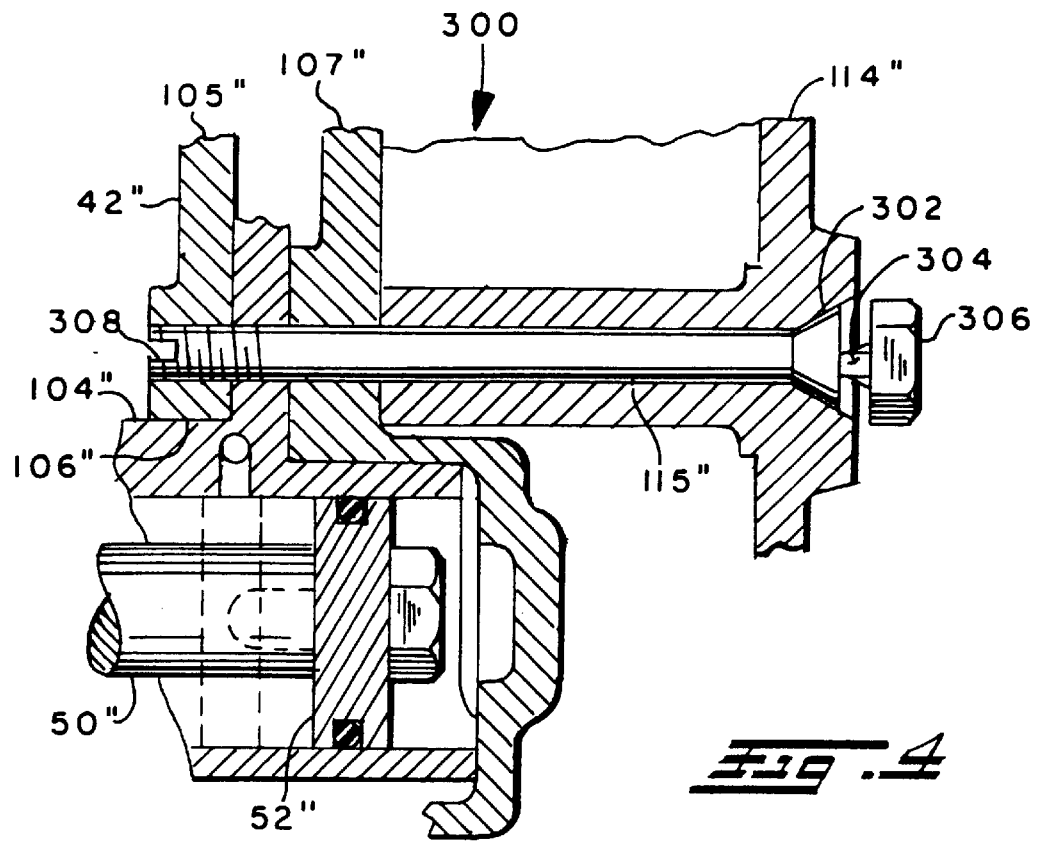
FIG. 4
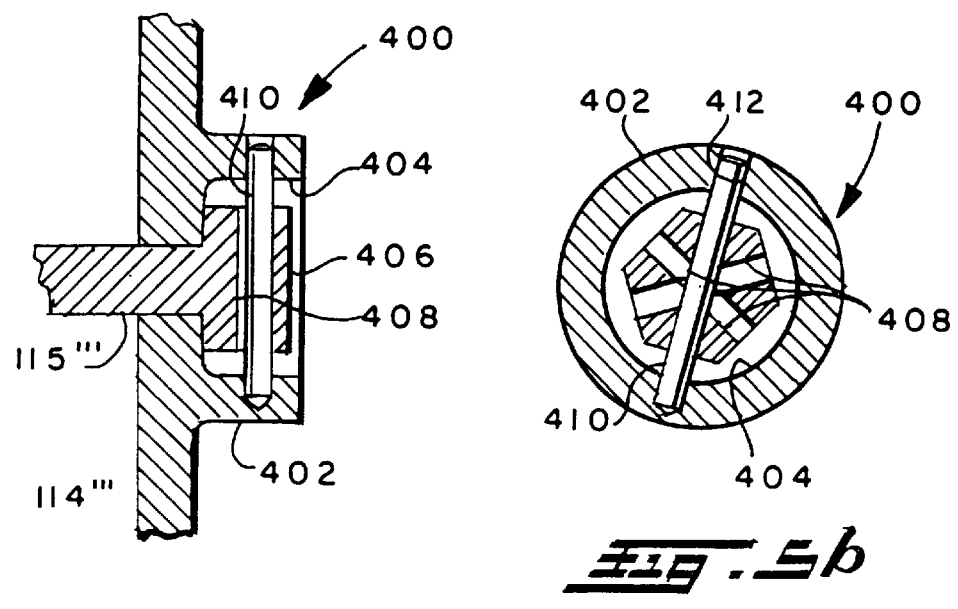
FIG. 5a
FIG. 5b

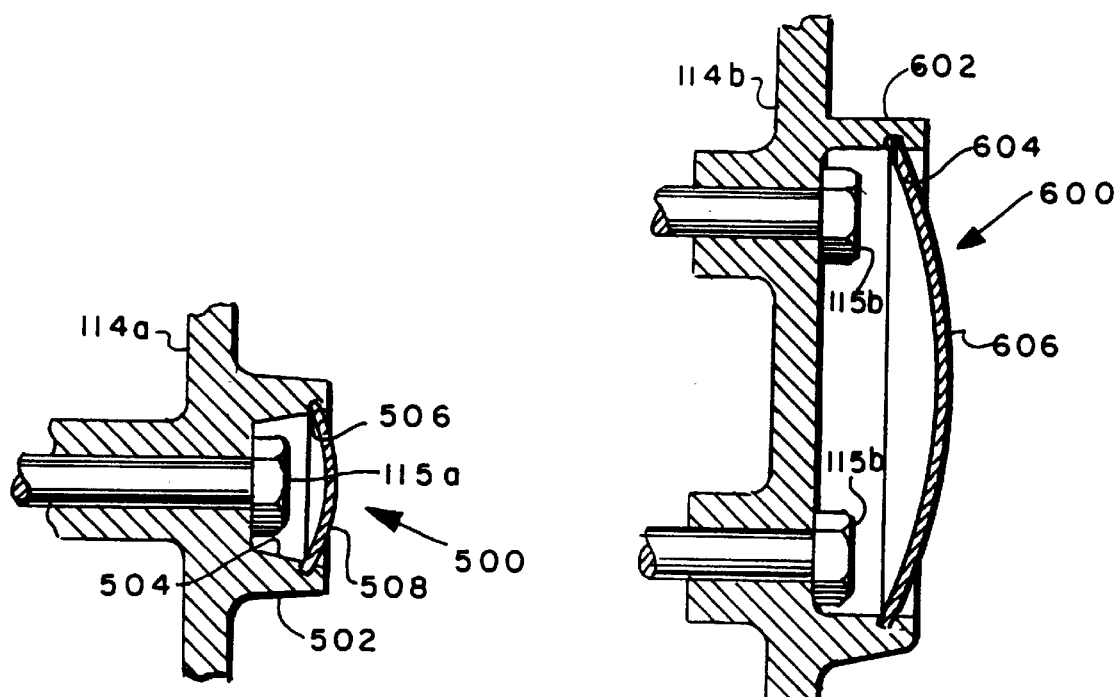
FIG. 6a
FIG. 6b
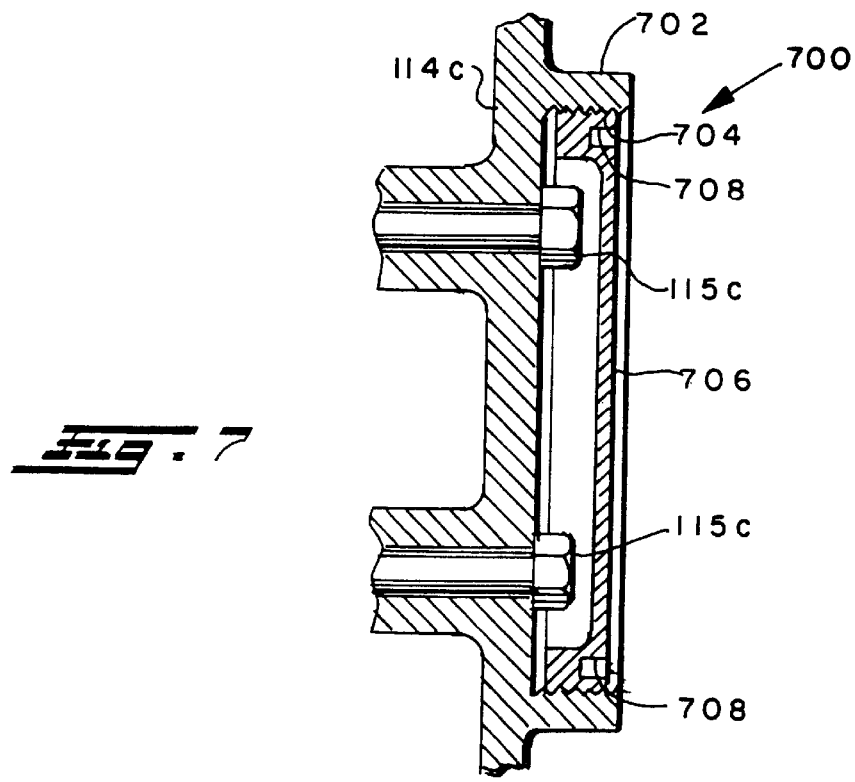
FIG. 7

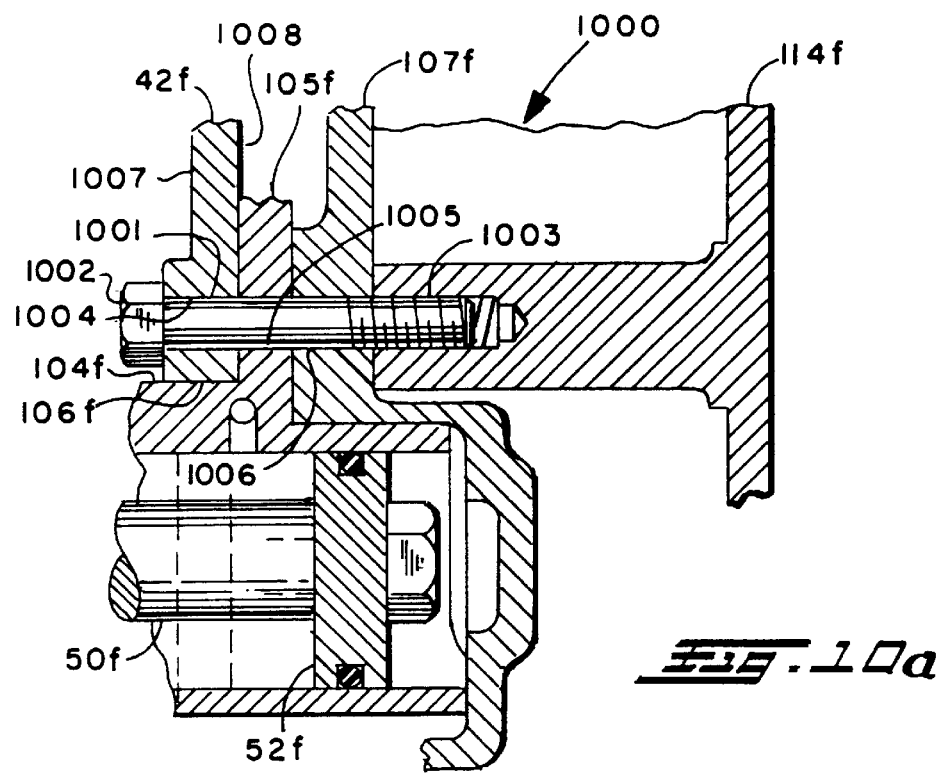
_Fig. 10a_
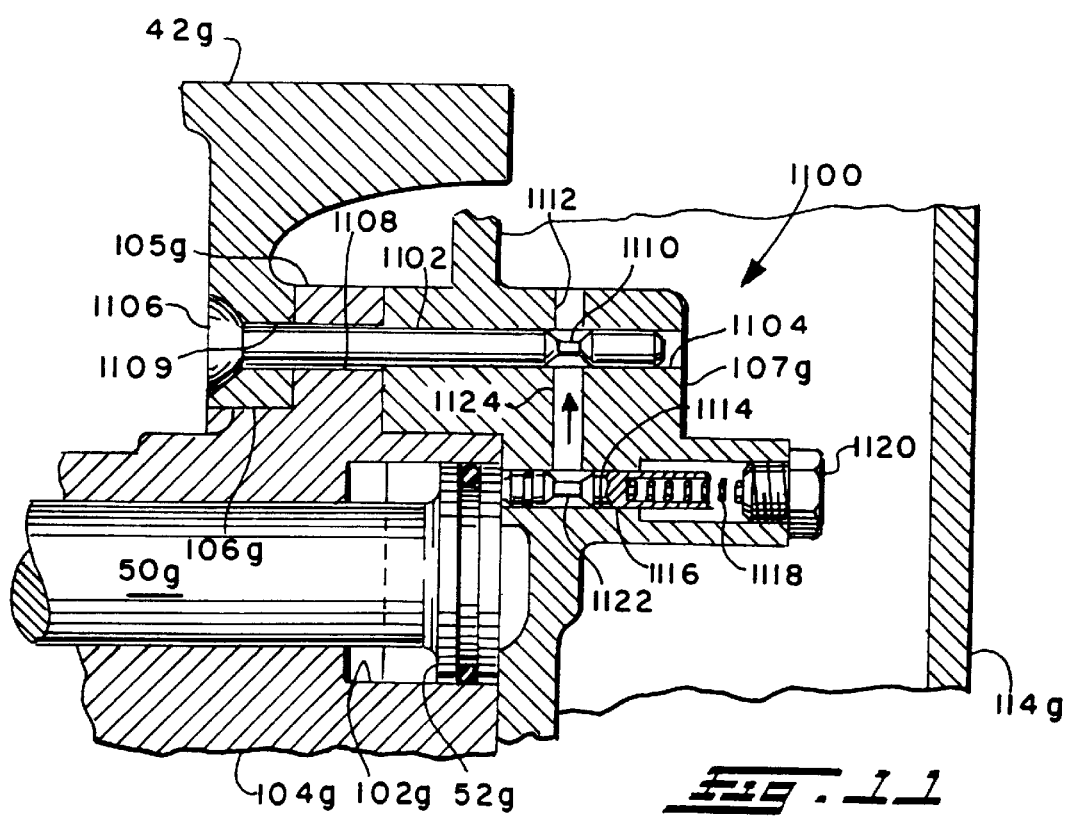
_Fig. 11_

TAMPER RESISTANT COVER FOR TRANSMISSION SHIFT

This application is a continuation of application Ser. No. 08/341,335, filed Nov. 16, 1994 now abandoned, which is a continuation of Ser. No. 018,646, filed Feb. 17, 1993 abandoned.

BACKGROUND OF THE DISCLOSURE

The present invention relates to heavy-duty power transmissions and particularly change-speed transmissions employed for heavy over-the-road trucks. Change-speed transmissions employed for over-the-road trucks are often compounded by having a primary section with manually shiftable speed range gears with the output thereof connected to the input of a secondary or auxiliary change-speed section, which is typically power shifted by fluid pressure operated pistons.

In over-the-road truck transmissions having a main and auxiliary change-speed sections, it is common to have the auxiliary section speed-changes accomplished by the driver actuating an electric switch on the manual shift lever for the main transmission section. In such arrangements, the driver-actuated switch energizes solenoid valves which control flow of pressurized air to either side of the actuator pistons which are connected to the shifting forks in the auxiliary transmission in a manner well known in the art. Thus, the driver may change the speed range of the auxiliary transmission without changing the speed range of the main transmission to give additional combinations of speed ranges for each speed range of the main transmission or, may leave the auxiliary transmission in a given speed range and shift only the main section.

In an attempt to improve fuel economy, it has been desired to regulate the road speed of heavy over-the-road trucks and to reduce the engine revolutions per mile by increased usage of an overdrive speed range, yet to provide a sufficient number of closely spaced changed-speed ratios to permit desired gross vehicle or gross combined weights of the vehicle tractor and trailer arrangement with adequate torque for maintaining road speed and enabling use of the transmission and engine combination to provide braking on grades. Thus, it has been found desirable to provide an automatically shifted overdrive range in an over-the-road truck transmission auxiliary section which is computer controlled responsive to sensor input such as engine torque, engine speed, throttle position, and road speed inputs rather than a driver controlled overdrive.

In one arrangement of a main and auxiliary change speed heavy duty truck transmission, the microcomputer controlled electronic circuit has been incorporated in the solenoid valve housing provided on the rear of the housing for the auxiliary section of the transmission to provide control of the automatic overdrive shifting of an overdrive in the auxiliary section in response to engine and speed parameters provided by electrical sensors in a manner which removes the control of the overdrive shifting from the driver. Such arrangements have proven effective for improving fuel economy, particularly where an electronically controlled road speed regulator or cruise control is employed on a vehicle to limit the maximum speed of the vehicle in conjunction with the electronically controlled overdrive. However, vehicles equipped with such a system have been subject to defeat of the electronic control of the overdrive to permit the driver to control the overdrive shift by tampering with the electronic control of the solenoid valves. Such tampering requires removal of the cover or housing over the electronic control unit and solenoid valves; thus it has been desired to prevent removal of this cover or at least make the removal of the cover sufficiently difficult to discourage such tampering.

SUMMARY OF THE INVENTION

The present invention provides a tamper resistant cover or housing for the electronically controlled fluid pressure servoactuator which automatically shifts the auxiliary section of a plural change-speed transmission of the type employed for heavy over-the-road trucks. The present invention provides, in one embodiment, a locking pin which engages a groove in bolt or fastener for the cover which fastener is installed interiorly of the cover. The locking pin is released only when the fluid pressure actuated piston for the shifter is in a desired position which requires enablement by the electronic controller.

In another embodiment, blind fasteners installed on the interior of the auxiliary section of the transmission require disassembly of the auxiliary section from the main transmission section in order to provide access to the fasteners for removal of the electronic control unit cover. In another embodiment, externally installed threaded fasteners have frangible portions removable upon installation, which thereafter require access to the interior of the auxiliary section of the transmission to permit removal of the threaded fastener.

The present invention thus provides tamper resistant installation for the cover or housing of an electronic control of an electronic control unit for the automatic shift control servoactuators employed with an auxiliary section of a heavy-duty plural change-speed power transmission.

BRIEF DESCRIPTION OF THE DRAWINGS

FIG. 1 is a cross-section of a plural change-speed power transmission having a main and auxiliary section with automatic shifting of the auxiliary section as known in the art;

FIG. 2 is an enlarged view of a portion of a cross-section similar to FIG. 1, modified to illustrate an embodiment of the present invention;

FIG. 3 is a right-hand view of the embodiment of FIG. 2;

FIG. 4 is an enlarged view of a portion of a section view similar to FIG. 1 showing an alternate embodiment of the present invention;

FIGS. 5a and 5b illustrate an alternate embodiment for the fastener of FIG. 4;

FIGS. 6a and 6b illustrate alternate arrangements of the embodiment of FIGS. 5a and 5b;

FIG. 7 is an alternate arrangement of the embodiment of FIG. 6b;

FIG. 10a is another embodiment of the invention employing a fastener from the interior of the casing to secure the electronic control cover;

FIG. 10b is a view of the embodiment of FIG. 10a in the disassembled condition; and, FIG. 11 is an alternate arrangement of the embodiment of FIG. 9.

DETAILED DESCRIPTION

Figure 9:
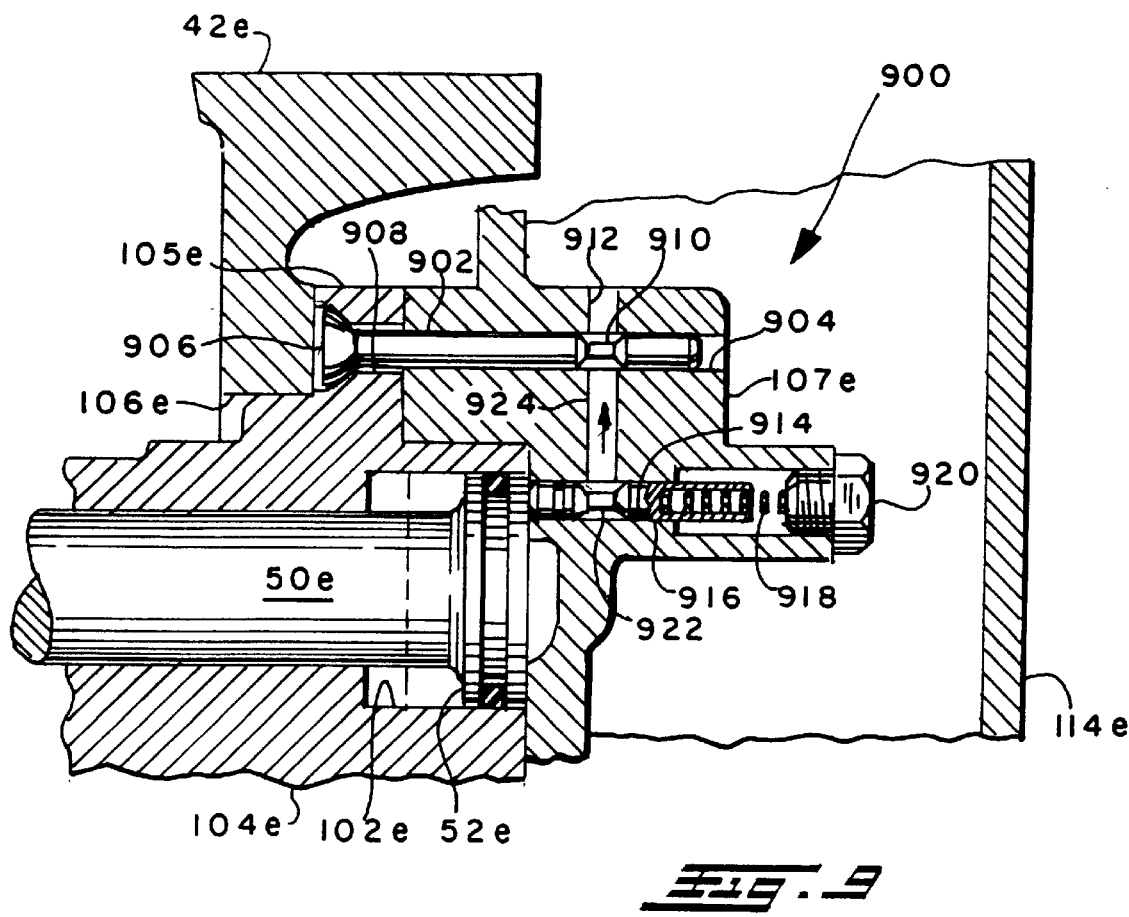
FIG. 9 is another embodiment of the invention employing a locking pin for securing the electronic control cover which is releasable only with the shift actuator in a certain position.

Referring to FIG. 1, a typical plural change-speed power transmission of the type employed for heavy-duty over-theroad trucks is indicated generally at 10, and has a main section housing or casing 12 containing a plurality of shiftable or change-speed gears, such as gear 14, which is a reverse speed gear, and which is clutched by a dog-clutch 16 splined to and slidable on an output power shaft 18 for drivingly engaging gear 14 with the shaft 18. Clutch 16 is engaged by a shift fork 20 movable on a shift rail 22 mounted in portions of housing 12; and, fork 20 is moved by a driver actuated shift lever 24. Typically, gear 14 is a reverse gear, and is driven from gear 26 on countershaft 28 via an intermediate idler gear 30 on idler shaft 32.

An auxiliary transmission section indicated generally at 40 has an auxiliary housing or casing 42 attached to the main housing 12 by suitable fasteners (not shown) and positioned thereon by locator pin 44.

Auxiliary section 40 receives power from main section output shaft 18 by a sliding dog-clutch member 46 which is splined to output shaft 18 and slidably movable thereon by shift fork 48 which is connected to an actuator rod 50 and moved by a fluid power piston 52.

In the forward or leftward-most position, clutch 46 engages an input gear 54 which is engaged with countergear 56 which drives countershaft 58. Shaft 58 also has mounted thereon a second countergear 60 and a third countergear 62 in axially-spaced arrangement thereon, and which are driven therewith.

The auxiliary transmission section 40 has a power shaft journalled on casing 42 by a pair of tapered roller type bearings indicated generally at 66. Shaft 64 receives power through sliding dog clutch 68 splined thereto; and, shaft 64 provides power output through yoke 70 splined thereon and secured by nut 72. Yoke 70 is adapted for connection to an articulating shaft connection or universal joint as is well known in the art.

Dog clutch 68 is engaged by shift fork 74 which is connected to an actuator rod 76, which is moved by fluid power piston 78, which is sealed for sliding movement in bore 80 formed in cylinder block 82 received in aperture 84 formed in the auxiliary housing 42 and block 82 is secured to housing 42 by fasteners such as bolts 88. A cover 90 seals the bore 80, and is attached to the block 82 by bolts 92. Air pressure passage 94 is ported through the cover 90 to communicate a first fluid pressure source (not shown) with bore 80. A second fluid pressure source (not shown) is provided and connected to passage 96 for providing fluid pressure to the opposite side of piston 78. An air valve (not shown) is operated by the driver is typically connected to provide a fluid pressure source to either side of the piston 78.

With rod 76 moved by piston 78 to the leftward or forward position as shown in FIG. 1, clutch 68 engages gear 98 with shaft 64. Shaft 64 is driven either by through gear 98 when clutch 46 is engaged with gear 98 as shown in FIG. 1. Thus, shaft 64 may be driven directly by shaft 18 to provide direct drive through the auxiliary section 40.

When piston 78 and clutch 68 are moved to the right or rearward position, shaft 64 is engaged with gear 100; and, with clutch 46 engaged to gear 98, power is transmitted from a shaft 18 to gear 98 to gear 60 and countershaft 58 to gear 62 to gear 100 to shaft 64 to provide a reduced speed to shaft 64.

When clutch 46 is moved to the leftward or forward position engaging gear 54, countershaft 58 is driven through gear 56; and, if clutch 68 is engaged with gear 100, shaft 64 is driven through from countershaft 58, countergear 62 and gear 100 to provide a reduced speed thereto.

However, if clutch 68 is in the forward position engaging gear 98, and clutch 46 is in the forward position, then countershaft 58 drives shaft 64 through countergear 60 and gear 98 and a higher range, or, if desired, an overdrive may be provided.

In the prior art embodiment shown in FIG. 1, clutch 46 has its actuator rod 50 connected to a fluid power piston 52 slidably received in a bore 102 provided in a cylinder block 104, which is received in an aperture 106 provided in the auxiliary housing 42 and registered thereagainst by a mounting flange 105.

A cylinder cover 107 closes piston bore 102 and communicates with opposite sides of the power piston 52 by suitable passages formed therein. A pair of solenoid operated valves 108,110 are mounted on the cylinder block 104; and, upon electrical energization, control flow of air pressure to either side of piston 52, depending upon which valve is energized.

An electronic control unit 112 is mounted adjacent solenoids 108,110 to the cylinder cover 107. The electronic control unit 112 is electrically connected via a connector (not shown) passing through control unit cover 114 to a source of power, such as the vehicle on-board battery, and receives desired sensory input such as engine speed, throttle position, and road speed from appropriate on-board sensors. Electronic control unit 112 typically employs a microcomputer programmed to automatically energize solenoids 108, 110 to appropriately shift the clutch 46 to engage and disengage overdrive gear 54 in accordance with a predetermined program in the microcomputer 112.

In the prior art arrangement of FIG. 1, the control unit cover 114 has through-bolt 115 which passes through an aperture 116 in the cylinder cover 107 and through an aperture 118 in the cylinder block 104, and is threadedly engaged in the auxiliary section housing 42. Thus, the electronic control unit cover, the cylinder block cover 107, and the cylinder block 104 may be removed by removal of bolts 115, which are readily accessible from the exterior of auxiliary section casing 42.

Referring to FIGS. 2 and 3, an embodiment of the invention is illustrated generally at 200 wherein the auxiliary transmission section housing 42' has an aperture of 106' formed therein and which is received a cylinder block 104' with piston powered actuator rod 50' slidably received therein. A cylinder block cover 107' is bolted through apertures 116' provided therein and through apertures 118' in the cylinder block 104' to the auxiliary housing 42' by bolts 115'.

The cylinder block cover 107' has mounted thereto a manifold block 202 which communicates with fluid passages (not shown) in the cylinder cover block 107' and has mounted thereon a pair of solenoids, one of which is shown at 204, and which operates a valve 206 controlling flow to one side of the piston for rod 50'. An electronic circuit board 208 is mounted within a cover 114' for the electronic control unit indicated generally at 209 mounted on circuit board 208.

The cover 114' is retained on cylinder block 106' by blind bolts 210, which have the heads thereof counter-bored in the left-hand or inner face of the cover 107' to prevent removal thereof from the exterior of the cover 114'. An electrical connector 212 is attached to the wall of the cover 114' and is adapted for electrical connection thereto to supply power and the sensory inputs to the electronic control unit 209.

A pair of blind bolts 214 have the heads thereof counter-bored in to the inner or left-hand face of the flange 105' on cylinder block cover 104'; and, the bolts 214 pass through apertures 216 formed therein and the bolts 214 threadedly engage the cylinder block cover 107' from the inner or left-hand face thereof. It will be understood that upon removal of bolts 115', the control unit cover 114', cylinder block cover 107', and cylinder block 104' may be moved outwardly or to the right in FIG. 2 only by the amount of the stroke of the rod 50' in the cylinder 104'. This amount is insufficient to permit ready access to the bolts 214 without special tooling. Accordingly, disassembly of the auxiliary casing 42' from the main transmission casing is required in the embodiment of 200 in order to permit ready removal of the electronic control unit cover 114'.

Referring to FIG. 4, another embodiment of the invention indicated generally at 300 has the auxiliary transmission casing 42" having received in aperture 106" thereof a cylinder block 104" with flange 105" and with rod 50" and actuator piston 52" received therein. A cylinder block cover 107", and an electronic control unit cover 114" are through-bolted to the auxiliary housing 42" by through-bolt 115". Bolt 115" has a counter-sunk head portion 302 connected by a frangible neck portion 304 to a driving head 306.

Upon torquing of the counter-sunk head 302 to the desired installation torque, the application of additional torque to driving head 306 causes the head portion 304 to break, and removal of the driving head 306, leaving the head portion 302 recessed. If the counter-sunk head 302 is formed of hardened material, it is then difficult to remove the bolt 115" from the exterior of the housing 114" because formation of any torque-engaging surfaces in the outer face of head 302 would require special hardened drilling or grinding equipment.

However, removal of the bolt 115" is enabled by a slot 308 formed in the end of the bolt opposite head 302 to permit disassembly once the transmission auxiliary casing 42" has been removed from the primary or main housing.

Referring to FIGS. 5a and 5b, another version of the embodiment of FIG. 4 is indicated generally at 400, with the electronic control unit cover 114''' having a raised circular boss 402 provided on the exterior thereof, with a counter-bore 404 provided therein. Through bolt 115''' has the driving head 406 thereof recessed in bore 404; and, head 406 castellated with grooves 408. The wall of the boss 402 is also cross-drilled as denoted by reference numeral 412 from one side thereof through the wall and blind-bored diametrically on the opposite side thereof such that a roll pin 410 may be received therethrough and pass through one of the grooves 408 in the head 406 to secure the bolt head therein. The single exposed recessed end of the roll pin 410 thus renders removal of the roll pin difficult and discourages tampering with the bolt.

Referring to FIG. 6a, another embodiment of the invention is illustrated generally at 500 wherein the electronic control unit cover 114a has through-bolt 115a received therethrough with an annular boss 502 formed about the head of bolt 115a on the outer surface of the cover 114a. The inner periphery 504 of annular boss 502 has a peripheral groove 506 formed therein with a domed, relatively thin disc 508 snapped therein to cover the head of bolt 115a. In order to access the head of bolt 115a, it is necessary to destroy disc 508 for removal from groove 506.

Referring to FIG. 6b, another embodiment of the invention is indicated generally at 600 wherein the electronic control unit cover 114b has heads of both through-bolts 115b surrounded by a common raised wall or boss 602, which has a peripheral groove 604 formed about the inner surface thereof with a thin metal disc 606 deformed or bowed with the periphery thereof snapped into engagement with groove 604. The embodiment 600 thus requires only a single snap disc to cover both of the bolts 115b; and, destruction of the disc 606 is required to access the heads of bolts 115b.

Referring to FIG. 7, a variation of the embodiment 600 is indicated generally at 700 as having the electronic control unit cover 114c formed with an annular raised boss or wall 702, which surrounds through bolts 115c and which has the inner periphery thereof provided with threads 704, which are engaged by the threaded periphery of metal disc 706 is engaged with threads 704 by suitable spanner recesses 708 provided therein to facilitate installation. The disc 706, once installed, may have the thread secured by any suitable expedient such as an anaerobic adhesive or by deformation of the metal of the boss 702 over the threads.

Figure 8:
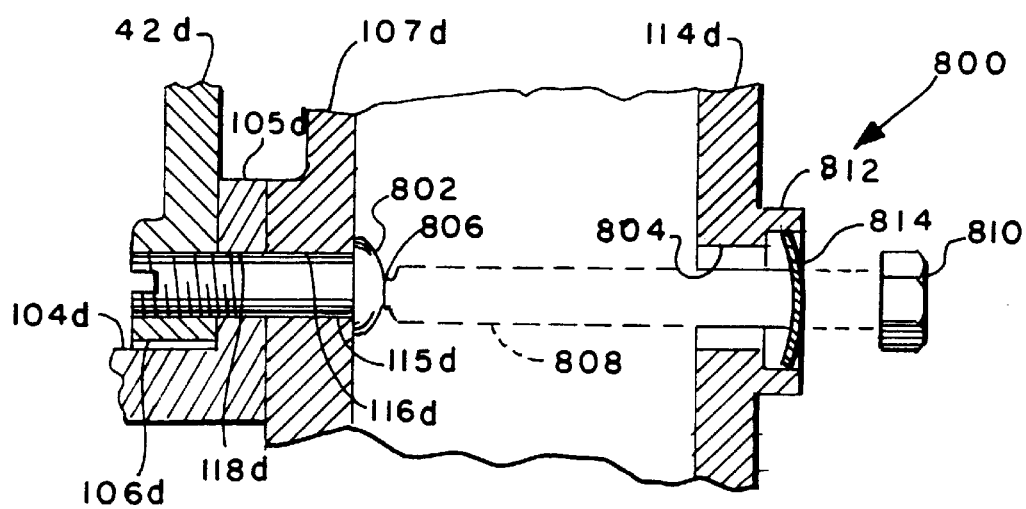
FIG. 8 is another version of the embodiment of FIG. 4.
Figure 9D:
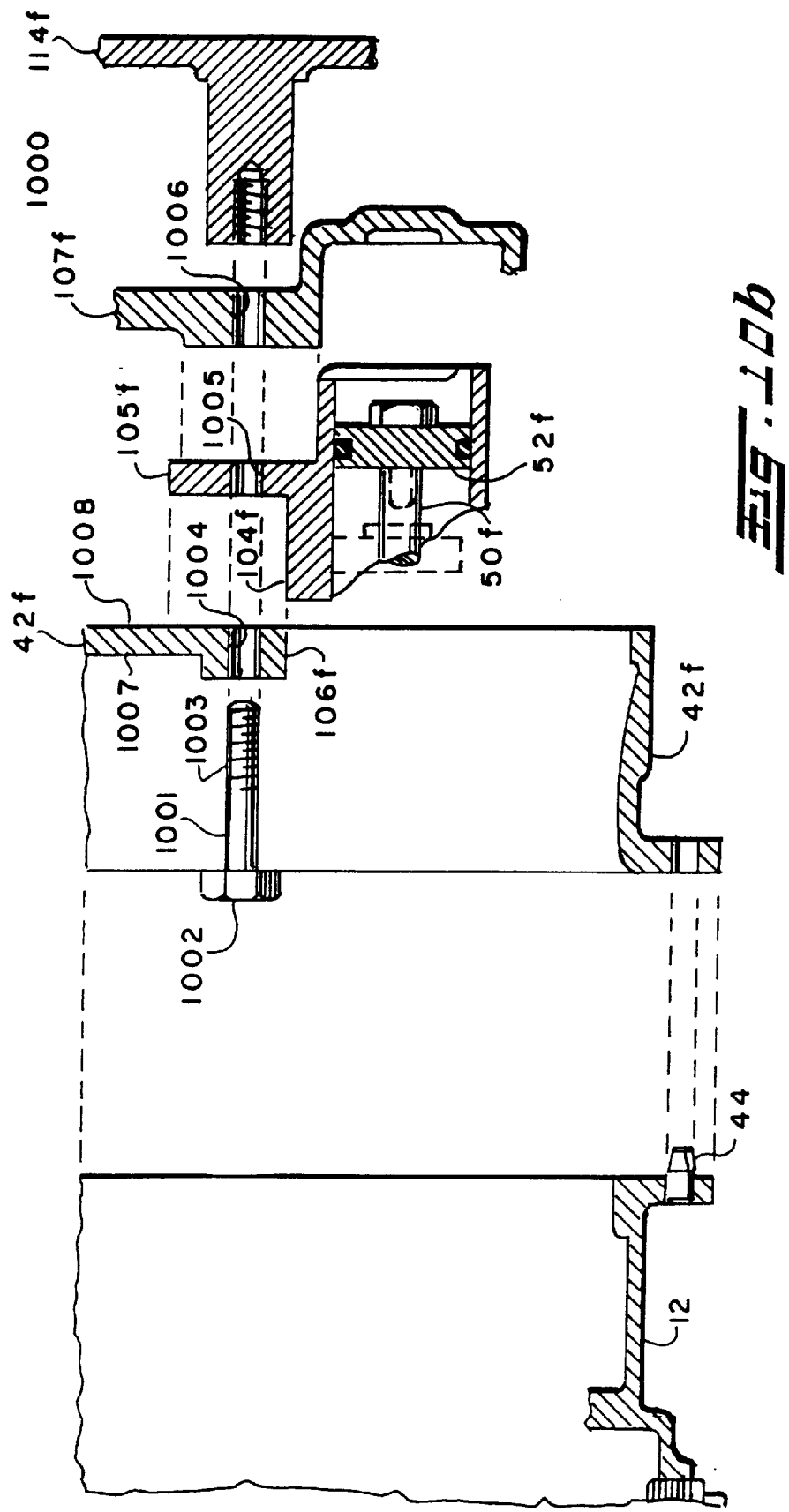

Referring to FIG. 8, another embodiment 800 is illustrated which comprises a variation of the embodiment 300 of FIG. 4 and the embodiment 800 has the auxiliary transmission casing 42d threadedly engaged by a bolt 115d which passes through an aperture 118d in the cylinder block 104d, which is received in casing aperture 106d with its flange 105d registered against the outer surface of casing 42d. An aperture 116d is formed in the cylinder block cover 107d with the head portion 802 of the bolt 115d registering against the outer surface of the cylinder block cover 107d to clamp the cylinder block cover 107d and cylinder block flange 105d to casing 42d. In the embodiment 800 of FIG. 8, the electronic control unit cover 114d may be integrally formed with the cylinder block cover 107d or attached thereto by weldment or internal fasteners (not shown) in any convenient manner.

The outer face or wall of cover 114d has an aperture 804 provided therein which is of sufficient size to provided clearance for the head 802 to pass therethrough upon installation of the bolt 115d. The head 802 is formed with a frangible neck portion 806 which has attached thereto a shank or extension 806 indicated in dashed outline in FIG. 8, which has a driving head 810 indicated in solid outline in FIG. 8, which extends outwardly beyond the exterior face of the cover 114d. Cover 114d has an annular raised boss 812 provided about aperture 804. Upon installation, when the head 802 of bolt 115d has been torqued to the desired level, additional torque causes the neck 806 to rupture, and permits removal of the shank 808 and head 810 from the assembly. Disc 814 is then press-fit into the inner periphery of the boss 812 to prevent access to bolt head 802.

Referring to FIG. 9, another embodiment of the invention is indicated generally at 900 wherein the cylinder block 104e with actuator piston 52e and actuating rod 50e received therein in a bore 102e with cylinder block cover 107e attached thereover for closing the cylinder bore 102e. The cylinder block cover 107e has a locating pin 902 received through bore 904 formed therethrough, which pin has a head portion 906 recessed in the inner or left-hand face of the flange 105e of the cylinder block 104e; and, pin 902 extends outwardly to aperture 908 provided in the cylinder block flange 105e.

Pin 902 has a circumferential groove or recess 910 formed therein which is located axially thereon at a common station in bore 904 with a cross-hole 912 which intersects bore 904 and which extends inwardly of the cover 107e to intersect a second pin bore 914, which communicates with the piston bore 52e; and, bore 914 is generally parallel to the bore 904.

A slider pin 916 is slidably received in bore 914 and is biased leftwardly or inwardly toward the piston chamber by a spring 918 which has one end engaged in a recess in the end of pin 916, and which has the other end registered against and is retained by a plug 920 threadedly received in the end of bore 914. Slider 916 also has a circumferential groove 922 formed therein intermediate the ends thereof which is engageable with the lower end of a cross-pin 924 slidably received in cross-hole 912. Cross-pin 924 has its upper end engageable with groove 910 in pin 902.

With reference to FIG. 9, the slider 916 is shown as moved to its extreme outward or right-hand position by the endface of piston 52e, which is illustrated in its outwardmost or right-hand extreme position in solid outline in FIG. 9 and the left-hand or inwardmost position of piston 52e is shown in dashed outline in FIG. 9. With the piston in the position shown in solid outline in FIG. 9, the slider 916 is moved to a position such that cross-pin 924 drops into recess 922 and permits the cylinder block cover 107e to be removed from the auxiliary housing 42e.

The rightwardmost position of the piston as shown in solid outline in FIG. 9 is attainable only by energizing the electronic control unit with appropriate electronic service equipment controls to apply fluid pressure to piston 52e on the left-hand or underside thereof. Without such electronic service equipment, the piston 52e is normally moved to the position shown in dashed outline in FIG. 9 or inwardly of the bore 102e; and, slider 922 follows the right-hand face of piston 52e under the urging of spring 918. The chamfered edges of the groove 922 exert a camming action against the end of cross-pin 924, causing the pin to move upwardly and engaged the recess 910 in pin 902, thereby preventing removal of the cover 107e from the cylinder block 104e.

In the embodiment of FIG. 9, it will be understood that the electronic control unit cover 114e may be attached to the cylinder block cover 107e by suitable blind fasteners or any other convenient expedient not accessible from the exterior thereof. It will also be understood that in the embodiment 900, the cylinder block cover 107e may be attached to the auxiliary housing 42e by externally accessible fasteners (not shown in FIG. 9) because removal of such fasteners would not permit the removal of pin 902 inasmuch as the cylinder block can be moved only a limited amount because of the piston bottoming out in bore 102e with actuator rod 50e connected to a shift fork. The embodiment of FIG. 9 thus requires electronic servicing equipment capable of providing a signal to the electronic control unit to cause the unit to energize a valve to move piston 52e to the position shown in solid outline before the cover 114e can be removed without removal of auxiliary casing 42e from the main housing.

Referring to FIGS. 10a and 10b another embodiment of the invention is illustrated generally by reference numeral 1000, which is an alternate version of the embodiment of 300 of FIG. 4, wherein auxiliary casing 42f has an aperture 1004 formed therein which is aligned with a bore 1005 formed in the cylinder block flange 105f. Referring to FIGS. 10A and 10B, it will be understood that the left hand surface of casing 42f as denoted by reference numeral 1007 is the interior side and the right hand surface denoted by reference numeral 1008 is the exterior side. The cylinder block 104f is received in aperture 106f formed in the auxiliary section casing, and has actuator means in the form of piston 52f connected to actuating rod 50f provided therein and moveable between the position shown in sold outline and the position shown in dashed outline. Aperture 1006 is formed through the cylinder cover 107f and a bolt 1001 with head 1002 is received through the apertures 1004, 1005, and 1006, and is engaged by threads 1003 in the control unit cover 114f. The embodiment of FIG. 10a and 10b thus requires removal of the auxiliary section casing 42f from the main section casing 12 in order to access bolt head 1002 to remove the cover 114f and the cylinder cover 107f and cylinder 104f.

Referring to FIG. 11, another embodiment is illustrated generally at 1100, and is an alternate version of the embodiment of FIG. 9 wherein the auxiliary section casing 42g has an aperture 1109 formed therein which is aligned with aperture 1108 formed in the flange 105g of the cylinder block 104g, which is received in bore 106g formed in the auxiliary casing. The cylinder cover 107g has a bore 1104 formed therein which is aligned with the bore 1108, and which has received therein a pin 1102 which has a head 1106 countersunk in the inner surface of the casing 42g.

Cylinder block cover 107g has a cross-hole 1112 formed therein intersecting bore 1104 and also intersecting a bore 1114 formed therein parallel to bore 1104 and intersecting the cylinder bore 102g in the cylinder block 104g. A slider 1116 having a circumferential groove 1122 formed thereon is received in bore 1114 and biased by spring 1118 in a leftward, inward direction with the end of spring 1118 retained by a threaded plug 1120. Pin 1102 has a similar circumferential groove 1110 formed therein axially coincident with cross-hole 1112. The groove 1122 formed in pin 1116 also coincides with cross-hole 1112 when the slider 1122 is pushed rightward by piston 52g moving to its rightward, or outer, extreme position shown in solid outline in FIG. 11.

In order to remove the control unit cover 114g in the embodiment of FIG. 11, the controller is operated by a test signal to cause the air valves to move piston 52g to the rightward position shown in FIG. 11, which permits a cross-pin 1124 slidably received in cross-hole 1112 to drop to its lower position engaging groove 1122 and disengaging groove 1110 to permit sliding removal of the cylinder block cover 107g and control unit cover 114g from the pin 1102. When the piston 52g is moved to the leftward position shown in dashed outline in FIG. 11, the sides of groove 1122 exert a camming action against the end of pin 1124, forcing the pin upward to engaged recess 1110 and preventing removal of the cover 107g and cover 114g.

Although the invention has hereinabove been described with respect to the illustrate embodiments, it will be understood that the invention is capable of modification and variation, and is limited only by the following claims.

We claim:

1. A change-speed transmission with automatic gear shifting, comprising:
   (a) transmission casing means housing said gears, said casing means including a main casing and an auxiliary casing fastened thereto;
   (b) actuator means operable to effect said automatic gear shifting;
   (c) control cover means attached to the exterior of one of said main casing and said auxiliary casing and, said cover means housing therein control means including electronic means operable to control said actuator means to effect automatic gear shifting; and
   (d) tamper-resistant fastening means attaching said control cover means to said auxiliary casing said fastening means disposed for attachment and removal only from the interior of said casing means for removal of said control cover means.

2. The transmission defined in claim 1, wherein said fastening means includes at least one threaded fastener installed from the interior of the auxiliary casing requiring disassembly of said auxiliary casing from said main casing to permit removal of the threaded fastener.

3. A change-speed transmission with automatic gear shifting comprising:
- (a) transmission casing means housing said gears said casing means including a main casing and an auxiliary casing fastened to said main casing section;
- (b) actuator means operable to effect said automatic gear shifting;
- (c) control means including electronic means operable for controlling said actuator means;
- (d) control cover means housing said control means; and
- (e) fastening means attaching said control cover means to the exterior of said auxiliary casing, said fastening means disposed for removal only from the interior of said casing means, wherein removal of said fastening means requires disassembly of the main casing from the auxiliary casing.

4. The transmission defined in claim 3, wherein said fastening means is a threaded fastener with the head interior to said transmission casing means and said fastening means is threaded into said control cover means, wherein disassembly of said main casing from said auxiliary casing is required for removal of said fastening means.

5. The transmission defined in claim 3, wherein said fastening means is a pin with a head thereon and is removable only from the interior of said casing means.

* * * * *